INVENTORS
Walter J. Gibson
Wilson F. Gibbons
BY
*[signature]*
ATTORNEY

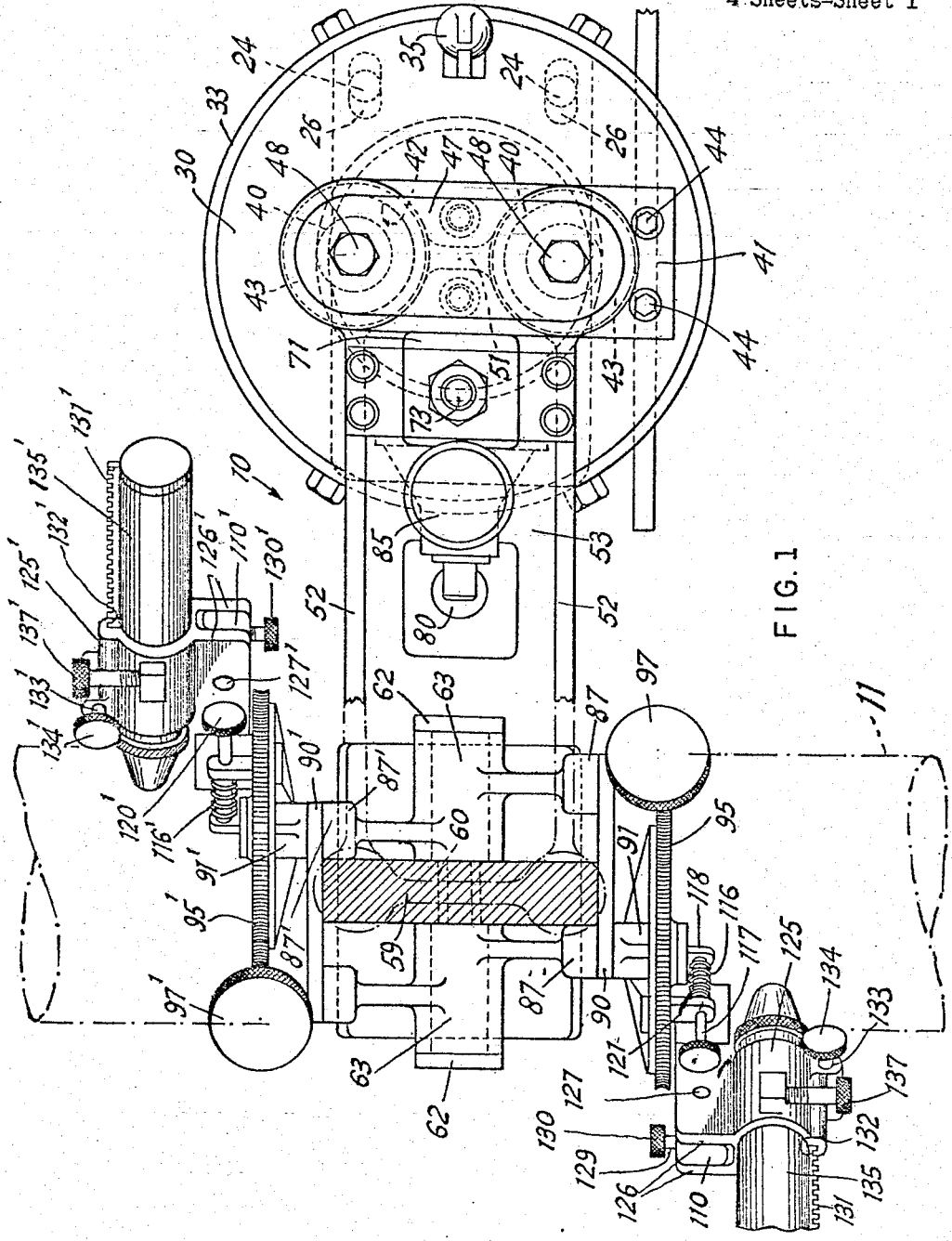

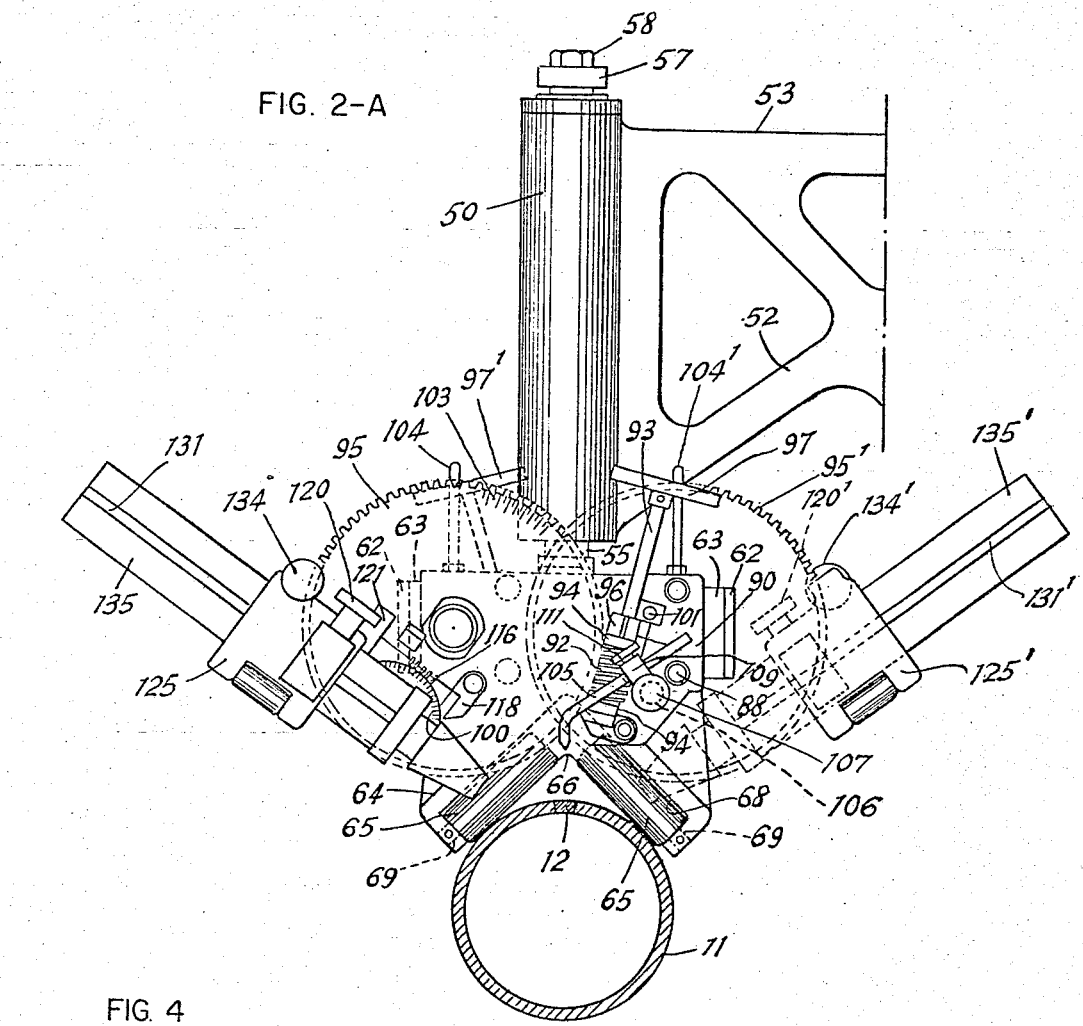

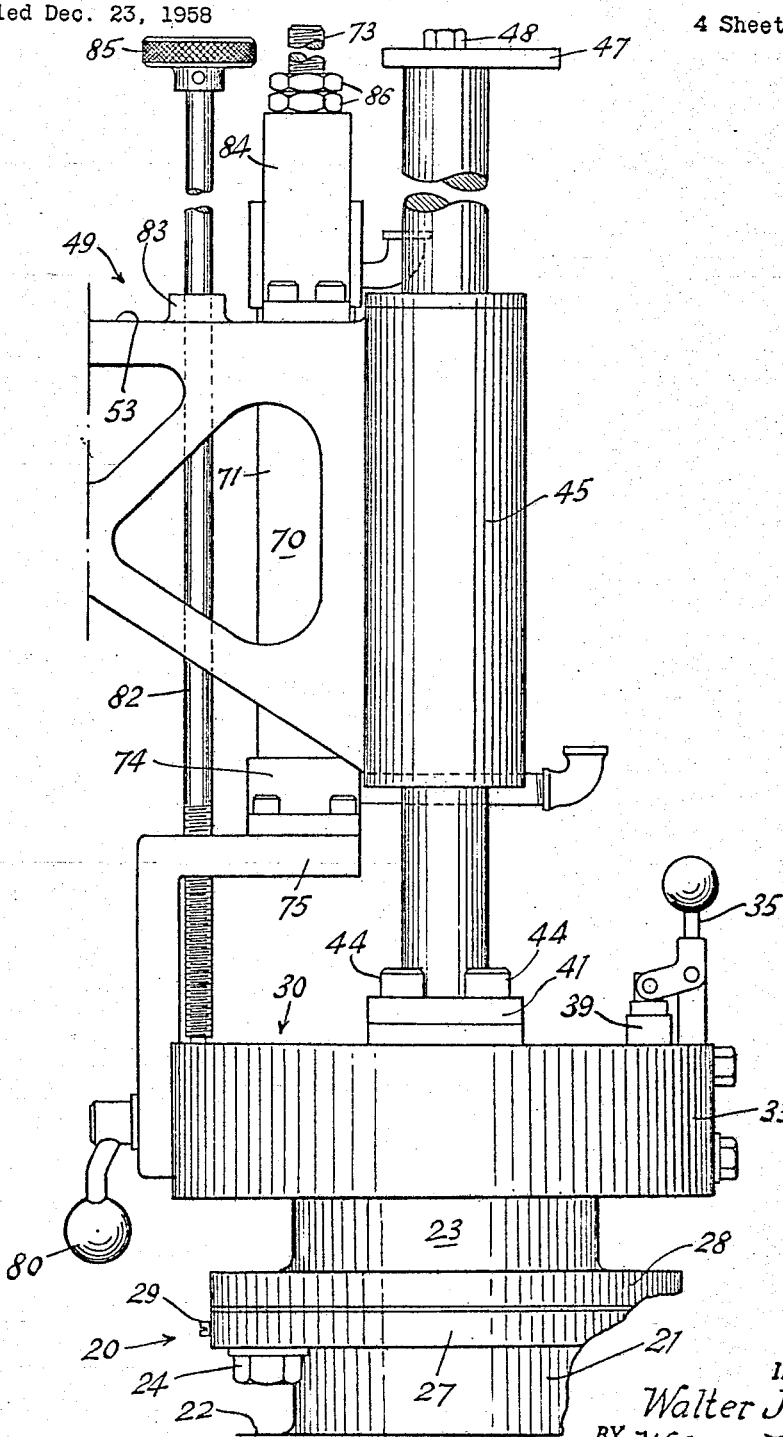
FIG. 2-B

United States Patent Office 3,056,286
Patented Oct. 2, 1962

3,056,286
WELD INSPECTION APPARATUS WITH TWO SPACED TRANSDUCERS
Walter J. Gibson and Wilson F. Gibbons, Alliance, Ohio, assignors to The Babcock & Wilcox Company, New York, N.Y., a corporation of New Jersey
Filed Dec. 23, 1958, Ser. No. 782,593
3 Claims. (Cl. 73—67.8)

This invention relates to apparatus for inspecting elongated seam welds progressively formed in work moving along a production line, such as in the production of electric resistance welded tubing. More particularly, the invention relates to a novel arrangement of plural detection means in parallel to scan the weld area irrespective of lateral variations of the weld from a normal or average longitudinal center line.

In recent years, ultrasonic inspection has become an accepted technique for determining the soundness of welded joints. In this technique, a "beam" of ultrasonic energy is directed into a welded joint by a transmitter and the ultrasonic energy passing through or reflected from the joint is detected by a receiver including means providing a visual indication of the quality of the interior of the welded joint and any discontinuities therein.

A known apparatus for ultrasonic inspection of electric resistance welded tubing in a production line includes a tank through which the tubing passes immediately after leaving the welding electrodes, this tank being filled with a suitable liquid, preferably water, to a level above the tubing. The ultrasonic energy is directed into the welded joint by means of a crystal supported on a search tube, which is accurately oriented and positioned relative to the welded joint. The position and orientation of the crystal relative to the welded tubing must be accurately maintained irrespective of lateral or vertical shifting of the welded tubing as it passes through the tank. In addition, the search tube must be so mounted that it can be readily moved out of operative relation with the tubing, as when terminating a "run" of welded tubing and starting a new "run" thereof. The copending application of Ernst W. Allardt and Albert M. DeStephen, Serial No. 681,091, filed August 29, 1957, shows and describes a novel support and manipulator, for the detection means, which accomplishes the foregoing objectives.

However, as the tubing moves along the production line, it tends to rotate or twist about its axis. While the angle of twist or rotation is very small, the weld area may be shifted laterally an amount such that the detection of a weld area defect by the usual single crystal cannot be absolutely assured.

In accordance with the present invention, such possibility is obviated, and detection of weld area defects is absolutely assured, despite rotation of the tube within the possible limits of such rotation. This is accomplished by mounting a second search crystal on the support and manipulator in laterally, and preferably longitudinally, spaced relation to the presently used single search crystal, the two crystals being electrically connected in parallel to the indicating apparatus.

The crystals or transducers are preferably oblong and preferably are mounted on opposite sides of the search tube carrier of the support and manipulator shown and described in said copending application. However, while this particular support and manipulator is preferred and will be hereinafter described as an exemplary carrier of the two transducers, the principles of the invention are equally applicable irrespective of the details of mounting the two crystals.

For an understanding of the invention principles, reference is made to the following description of a typical embodiment thereof as illustrated in the accompanying drawings. In the drawings:

FIG. 1 is a part sectional plan view of the support and manipulator incorporating the dual transducer arrangement of the present invention;

FIGS. 2A and 2B together constitute a front elevation view of the invention arrangement;

FIG. 4 is a diagrammatic view of the inspection system.

Figure 3:
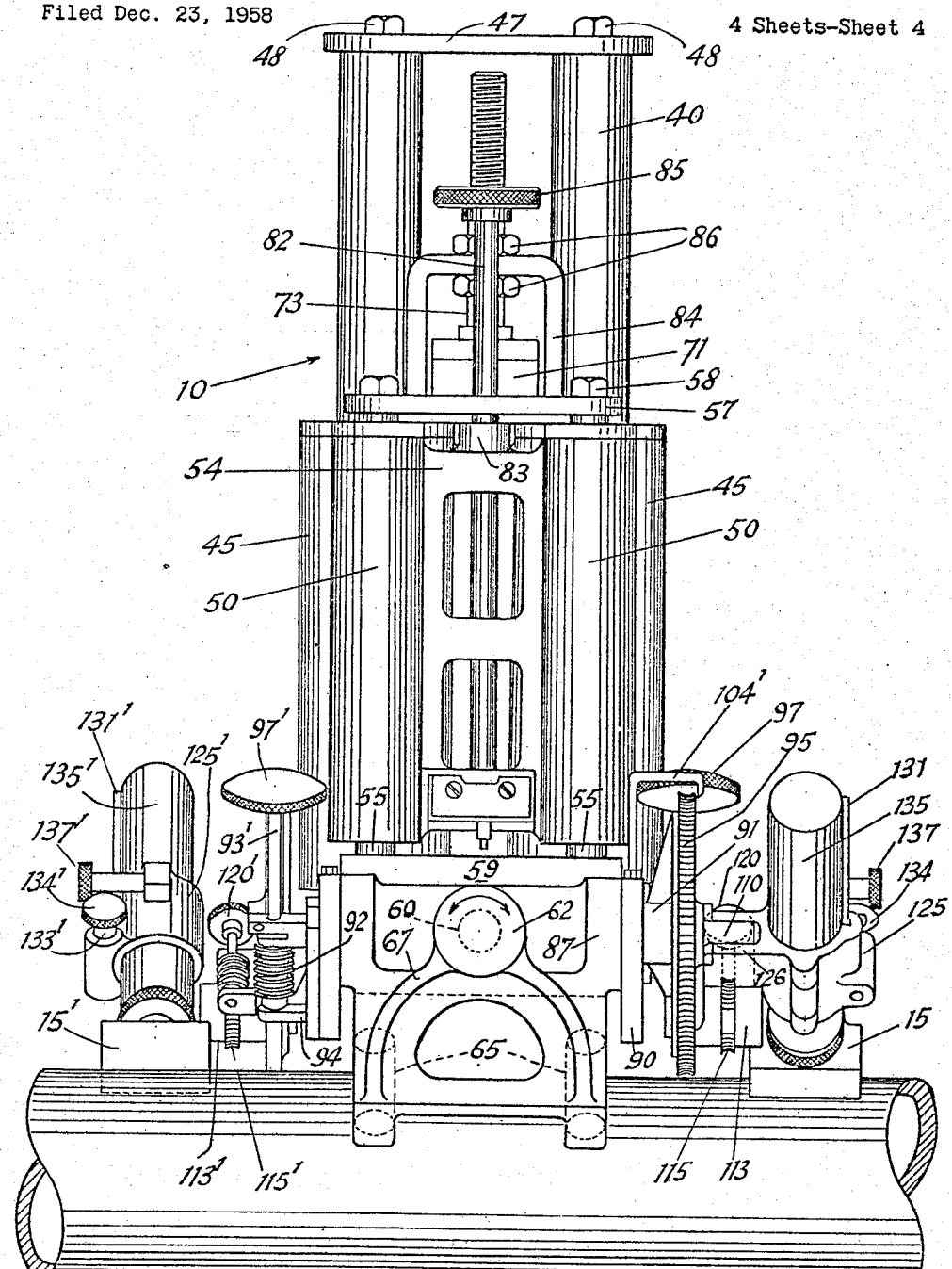
FIG. 3 is a side elevation view thereof.

The support and manipulator 10 illustrated in the drawings is, in most respects, identical with that shown and described in said Allardt et al. copending application and, as respects such features of identity, will be described generally and not in detail, reference being made to such copending application for illustration and description of the detailed construction. Support and manipulator 10 differs from that of said copending application in the mounting means for the dual transducers, and in certain improvements in the transducer guiding arrangement forming part of the subject matter of the copending application of Walter J. Gibson et al., Serial No. 782,592, filed simultaneously herewith.

Referring to FIGS. 1, 2A, 2B and 3, the support and manipulator 10 is arranged to be mounted laterally adjacent a production or mill line for electric resistance welded tubing 11 at a position intermediate the point where the tubing emerges from the resistance welder (not shown) and the point where it enters a sizing mill (not shown). Support and manipulator 10 is designed to accurately position and orient an ultrasonic testing device, such as a pair of ultrasonic crystals 15, 15' mounted in search tubes 135, 135' and spaced laterally and longitudinally from each other relative to the resistance weld 12 in tubing 11.

As tubing 11 leaves the resistance welder, it passes through a mill tank, not shown, containing a liquid such as water to a level sufficient to submerge tubing 11. In passing through this tank, tubing 11 engages sealing gaskets in the tank end walls to prevent loss of fluid from the mill tank. Support and manipulator 10 is arranged to lift and swing search tubes 135, 135' and crystals 15, 15' between a position in the mill tank in operative relation to tubing 11 and a position in a "test" tank positioned laterally of the mill line in alignment with the mill tank. This test tank has mounted therein a piece or coupon of electric resistance welded tubing having a manufactured or purposeful defect in its resistance weld zone. This defect may, for example, comprise a sawcut 0.010" wide, 0.006" deep, and about 3/4" long. This test tubing provides for periodic testing and calibration of the test apparatus while search tubes 135, 135' and crystals 15, 15' are in the test tank so that, when the search tubes and crystals are moved into the mill tank, no further adjustment is needed.

Support and manipulator 10 is positioned for swinging movement about a vertical axis exactly half-way between the center line of the mill line and the center line of the test coupon. For this purpose, a support base 20 is accurately positioned halfway between these center lines. Base 20 comprises a lower section 21, fixed on a horizontal bracket 22 extending laterally of the mill line, and an upper section 23 secured to section 21 by headed studs 24 extending through slots 26 in a flange 27 in section 21 and threaded into a flange 28 of section 23. These slots provide for accurate adjustment of section 23 relative to the mill line, such adjustment being effected by set screws 29 threaded into flange 27 and engaging studs 24. Bracket 22 also supports the mill tank and test tank.

Section 23 has a circular flange (not shown) on its upper end serving as a support for a rotary table 30. Table 30 is supported on an annular anti-friction bearing seated in a circular recess, in the upper surface of such flange, and an annular groove in the lower surface of table 30. A cylindrical depending collar 33 on table 30 surrounds the flange on section 23 and has rollers mounted therein with their axes radial of collar 33. These rollers engage the undersurface of the flange and are adjustable vertically of collar 33 to maintain table 30 parallel to such circular flange.

Table 30 provides for swinging movement of support and manipulator 10 to position crystals 15, 15' with respect either to tubing 11 or to the test coupon. The support and manipulator is locked in either of these two positions by a crank 35 pivoted on a post on table 30 and connected to a pin secured to a tapered head slidable in a guide bushing 39 and engageable in either of a pair of diametrically opposite tapered bushinged apertures in the upper surface of the flange on the upper end of part 23. A coil spring biases the tapered head on the pin to enter the tapered bushinged apertures.

A clamping plate 41 extends diametrically of table 30 at right angles to the diameter intersecting the pin. Plate 41 has a pair of circular apertures at equal distances either side of the axis of rotation of table 30, and these apertures receive cylindrical columns 40 having base flanges beneath plate 41. Studs 44 secure plate 41 to table 30 to clamp the flanges 43 thereagainst. Slide sleeves 45 are slidably mounted on columns 40 by means of vertically spaced ball bushings secured in each sleeve. A strap 47 interconnects the upper ends of columns 40, being recessed to seat the upper ends of the columns and secured thereto by studs 48.

Sleeves 45 form integral parts of a cantilever support 49 including a web 51 interconnecting sleeves 45, spaced parallel webs 52 each extending radially of a sleeve 45, a pair of sleeves 50 at the outer ends of webs 52, an apertured top wall 53, and transverse webs 54 interconnecting sleeves 50. Sleeves 50 have fixedly mounted therein vertically spaced ball bushings engaging vertical shafts 55 to allow limited free vertical movement thereof for a purpose to be described.

The upper ends of shafts 55 are rigidly interconnected by a strap 57 recessed to fit these upper ends and connected thereto by studs 58. The lower ends of shafts 55 are interconnected by an upright plate or bar 59 having an aperture midway between shafts 55, and a shaft 60 is secured through this aperture to extend horizontally and parallel to webs 52. Shaft 60 extends through horizontally spaced ball bushings fixed in sleeves 63 having their outer ends closed by caps 62. Sleeves 63 are part of an integral structure including a pair of depending vertical flanges 64 each having a 90 degree V-notch 66 in its lower edge bisected by the axis of the associated shaft 55. Braces 67 interconnect plates 64.

Each side of the V-notch 66 in each plate 64 has a rectangular recess 68 therein receiving a roller 65 rotatable on a shaft 69. The axes of rollers 65 are normal to each other, and these rollers ride along tubing 11. The limited free vertical movement of shafts 55 in the ball bushings accommodates vertical deflection or "breathing" of tubing 11, and the limited free horizontal movement of the ball bushings on shaft 60 accommodates horizontal deflection or "breathing" of tubing 11. Also, oscillation of sleeves 63 about shaft 60 permits the rollers to follow vertical ripples in the tubing 11. Rollers 65 thus closely follow movements of tubing 11 as the latter passes under the rollers and maintain crystals 15, 15' fixed laterally and vertically relative to tubing 11.

Before describing the adjustable supporting means mounting each crystal 15, 15' and its search tube 135, 135' on support 49, reference will be made to the means for raising and lowering this support. This means comprises a fluid pressure actuator 70 including a cylinder 71 and a piston having a piston rod 73 with a threaded upper end. The base 74 of cylinder 71 is bolted to the horizontal leg of an angle bracket 75 having a vertical leg formed with a vertical slot receiving a boss on cylindrical collar 33. This boss is apertured and threaded to receive the threaded stem of a locking clamp 80.

A scale on the side of the slot is cooperable with a pointer secured on table 30. This scale is graduated in tubing sizes so that the vertical position of bracket 75 and actuator 70 relative to table 30 may be adjusted and set in acordance with the size tubing 11 being welded. Vertical adjustment of bracket 75 is effected by a rod 82 threaded through the horizontal leg of bracket 75 and having its lower end engaging table 30. The upper part of rod 82 extends rotatably through a bearing 83 on top wall 53 of support 49, an operating knob 85 being secured to the upper end of shaft or rod 82. By turning knob 85, actuator 70 is adjusted vertically relative to table 30, and is locked in adjusted position by clamp 80.

Stem 73 of actuator 70 extends through top wall 53 of support 49 and through the horizontal leg of an inverted U-shape strap bracket 84 secured to the upper surface of wall 53. Stem 73 is clamped to bracket 84 by nuts 86 on the stem above and below the horizontal leg of the bracket. It will be seen that extension and retraction of actuator 70 will raise and lower support 49, the adjustable lower limit of movement coinciding with a position in which rollers 65 engage the upper quadrants of the particular size tubing 11 being seam welded.

The adjustable supporting means for the two transducers or crystals are identical, so that only one will be described in detail. The integral structure including sleeves 63 is formed with oppositely directed, transversely offset pairs of bosses 87 which are tapped and have plane vertical outer surfaces. For mounting transducer 15, one pair of bosses is engaged by a mounting plate 90 secured to the bosses by studs 88 threaded through plate 90 into the bosses. A hub 91 is threaded into plate 90 and rotatably supports a worm gear 95 engaged by a worm 92 on a shaft 93. Shaft 93 is rotatably mounted in axially spaced bearings supported in correspondingly spaced ears 94 projecting from a bracket 96 pivoted at one end to plate 90. Adjustment of worm 92 into playless engagement with gear 95 is effected by a stud threaded through a bracket on plate 90 and engaging the radially outer ear 94. This stud has a lock nut thereon and bracket 96 is secured in adjusted position by a stud 101 extending through an arcuate slot in the outer end of the bracket and threaded into plate 90. An operating knob 97 is secured to the outer end of shaft 93.

Gear 95 as a 360 degree scale 103 thereon cooperable with a pointer 104 threaded into plate 90 and having a bent outer end extending over gear 95. Gear 95, rotated by turning knob 97, revolves the crystal mounting through a range of 230 degrees about weld 12.

A shouldered stud 106 is threaded into plate 90 adjacent bracket 96 and is formed with a knurled operating head 107. A sleeve on stud 106 has welded thereto an apertured block 109 through which extends a bent pointer 105 arranged to have its indicating end centered on weld 12. A thumb set screw 111 clamps pointer 105 in its adjusted position. The angular position of the pointer is adjustable by loosening stud 106, turning the sleeve, and re-tightening the stud.

Pointer 105 is initially adjusted into alignment with weld 12. Thereby, any variation in the orientation of weld 12 can be readily detected by observation of the relation of weld 12 to pointer 105. Should any such variation be noted, suitable readjustments can be made in the crystal mounting to properly re-position and re-orient the crystal relative to weld 12. A stud is threaded into gear 95 near its outer periphery and rotatably supports the hub 113 of a radial bar 110. A scale 100 is suitably fixed to the outer end of this stud and cooperates with a pointer secured to bar 110. An annular worm gear 115 is secured to hub 113 and engaged by a worm 116 on a shaft 117 having an operating knob 120. Shaft 117 is rotatably mounted in a bracket 121, identical with bracket 96, pivoted at one end to gear 95 and adjusted and locked in the same manner as bracket 96.

A hinged bracket 125 has a pair of parallel flanges 126 between which bar 110 extends, bracket 125 being pivoted to bar 110 by pin 127 extending through flanges 126 and bar 110. On one side of pin 127, bar 110 has a recess seating a coil spring bearing against bracket 125. On the other side of pin 127, a stud 129 having an operating head 130 is threaded through bar 110 with its inner end engaging bracket 125.

Bracket 125 embraces search tube 135 which has a rack 131 extending therealong and through a keyway 132 in bracket 125. The bracket is clamped around search tube 135 by a stud 133 rotatably extending through one part of bracket 125 and threaded into the other part thereof. Stud 133 has an operating head 134.

Oblong crystal 15 is supported on the inner end of search tube 135 and the spacing of crystal 15 from tubing 11 is adjusted by a spur gear rotatably mounted in bracket 125 and meshing with rack 131, the spur gear having an operating knob 137. After search tube 135, and thus crystal 15, are longitudinally adjusted by rotating knob 137, stud 133 is screwed in to lock hinged bracket 125 on the search tube. The pivotal mounting of bar 110 in bracket 125, in association with the spring and stud 129, constitutes a "wobble drive" to adjust crystal 15 to the correct electronic right angle. This adjustment is effected by means of knob 130. The mounting and adjustment of oblong crystal 15' is identical with that of crystal 15 and the same reference numerals primed have been used to designate the corresponding mounting elements of crystal 15'.

In a specific example, crystals 15, 15' are lithium sulfate crystals ⅜" in diameter and spaced longitudinally approximately 12". With the laterally offset mounting arrangement illustrated and with the crystals being 10 megacycles and connected in parallel to a single detection and indicating system 140, as indicated in FIG. 4, the weld arc of electric resistance welded tubing is scanned, irrespective of rotational variation of the tubing, within a limit of ¾" centered on the weld. With the invention arrangement, the possibility of missing a defect due to tube twisting is obviated, as one or the other of the crystals will pick up any defect within the limits of rotational twist.

The arrangements for automatic elevation of the crystals to prevent damage are the same as those shown and described in said copending application of Allardt et al.

While a specific embodiment of the invention has been shown and described in detail to illustrate the application of the invention principles, it will be understood that the invention may be embodied otherwise without departing from such principles.

What is claimed is:

1. An inspection mechanism for scanning a longitudinal seam weld in tubing being progressively welded and in which the tubing is subjected to lateral and/or vertical shifting a limited extent during the progressive welding operation, said mechanism comprising a pair of ultrasonic inspection devices, each of said devices being capable of detecting a welding flaw independently of the other, and each of said inspection devices being symmetrically disposed in operative relation to the longitudinal centerline of the welded seam so that one of said inspection devices is positioned on one side of the welded seam and the other inspection device being positioned on the other side of said welded seam in longitudinal spaced relationship with respect to said first mentioned inspection device, and said pair of inspection devices being connected in parallel to a means for indicating any detected flaw in the welded seam irrespective of any shifting of the welded seam beyond the detecting zone of any one of said inspection devices.

2. An ultrasonic inspection mechanism for scanning a longitudinal seam weld in tubing being progressively welded in a tubing mill line in which the tubing has a tendency to rotate about its axis or to deflect laterally a limited extent during its passage through the mill line, said mechanism comprising a support, mounting means connected to said support and positioned adjacent the welded seam, a pair of inspection devices connected to said mounting means, each of said inspection devices including a crystal transducer and an associated search tube capable of independently detecting a flaw, each of said pair of inspection devices being disposed in operative relation to the longitudinal centerline of said welded seam so that the crystal transducer and associated search tube of one inspection device is positioned on one side of the longitudinal welded seam, and the crystal transducer and associated search tube of the other inspection device positioned on the other side of the welded seam in longitudinally spaced relationship with respect to the first mentioned crystal transducer and associated search tube, and said pair of inspection devices being connected in parallel to a means for detecting flaws in the welded seam irrespective of any deviation of said welded seam beyond the detection zone of any one of said inspection devices.

3. An ultrasonic inspection mechanism for scanning a longitudinal seam weld in tubing progressively welded in a tubing mill line in which the tubing is subjected to lateral and/or vertical shifting to a limited extent in its passage through the mill line, said mechanism comprising in combination a support, inspecting means connected to said support, said inspection means including a pair of inspection devices each having a crystal transducer and an associated search tube, each transducer and associated search tube being independently capable of detecting a welding flaw and said pair of inspection devices being disposed in operative relation to the longitudinal normal centerline of said welded seam so that the crystal transducer and associated search tube of one inspection device is positioned on one side of the welded seam and the crystal transducer and associated search tube of the other inspection device positioned on the other side of the welded seam in longitudinally spaced relationship with respect to the first mentioned crystal transducer and associated search tube, and said pair of inspection devices being connected in parallel to a flaw detecting means to detect flaws in the welded seam irrespective of deviation of said welded seam beyond the detecting zone of any one of said inspection devices.

References Cited in the file of this patent

UNITED STATES PATENTS

| | | |
|---|---|---|
| 2,666,862 | Branson | Jan. 19, 1954 |
| 2,672,753 | Drake | Mar. 23, 1954 |
| 2,799,157 | Pohlman | July 16, 1957 |
| 2,908,161 | Binger | Oct. 13, 1959 |

FOREIGN PATENTS

| | | |
|---|---|---|
| 716,687 | Great Britain | Oct. 13, 1954 |
| 726,824 | Great Britain | Mar. 23, 1955 |